G. H. GIBSON.
MEASURING APPARATUS.
APPLICATION FILED SEPT. 26, 1913.

1,191,416.

Patented July 18, 1916.

WITNESSES

INVENTOR

BY

ATTORNEY

UNITED STATES PATENT OFFICE.

GEORGE H. GIBSON, OF MONTCLAIR, NEW JERSEY.

MEASURING APPARATUS.

1,191,416.  Specification of Letters Patent.  Patented July 18, 1916.

Application filed September 26, 1913. Serial No. 791,924.

*To all whom it may concern:*

Be it known that I, GEORGE H. GIBSON, a citizen of the United States of America, residing in Montclair, in the county of Essex and State of New Jersey, have invented certain new and useful Improvements in Measuring Apparatus, of which the following is a true and exact description, reference being had to the accompanying drawings, which form a part thereof.

My present invention relates to measuring apparatus, especially adapted for, though not necessarily limited to, use in obtaining a measure of the rate of flow of a fluid through a conduit.

One object of my invention is to provide an exceedingly simple and effective device for measuring the differential of two fluid pressures.

Another more specific and highly important object of the invention is to combine simple and effective force translating means or rectifying provisions whereby a primary force causes a secondary force, which is a function of, but is not in linear proportion to the primary force, to be impressed on a movable element, with simple and effective supporting means for said element, including an electro magnetic device which exerts a supporting force in linear proportion to the strength of its energizing current which may be varied as required to maintain said element substantially stationary. When so used the electric current, which may be readily and accurately indicated, recorded or integrated by a suitable commercial ammeter of known type, is in linear proportion with, and forms a direct measure of said secondary force.

For instance, in the use of the invention for the purpose for which it is primarily devised, the primary force may be the differential of pressures in a conduit, so taken that the differential is a measure of the velocity head at some point in the conduit of the fluid flowing therethrough, and the translating device may be so arranged that the secondary force will be proportional to the square root of the pressure differential, and hence in linear proportion to the fluid rate of flow through the conduit.

The various features of novelty which characterize my invention are pointed out with particularity in the claims annexed to and forming a part of this specification. For a better understanding of the invention, however, and of the advantages possessed by it, reference should be had to the accompanying drawings and descriptive matter, in which I have illustrated and described one form in which my invention may be embodied.

Figure 1:
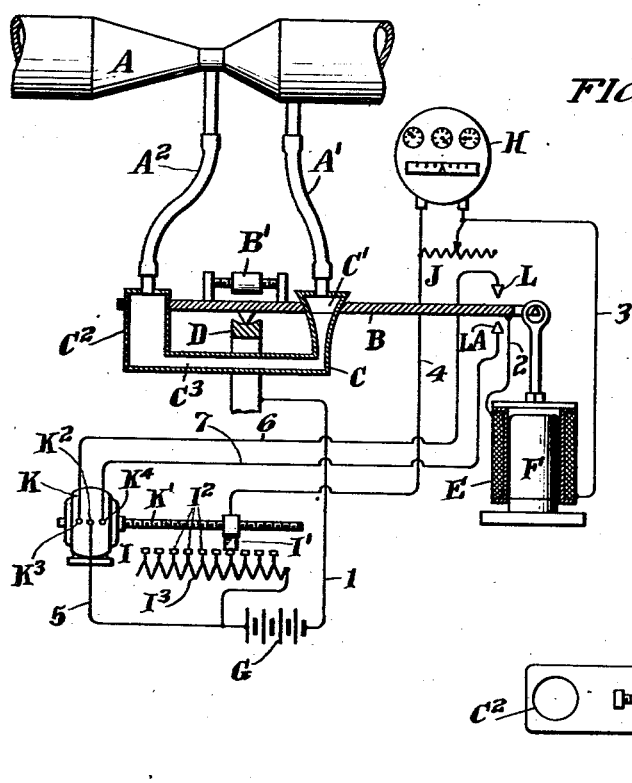
Figure 2:
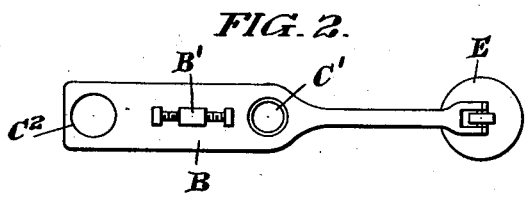

Of the drawings: Figure 1 is a diagrammatic representation of apparatus including a suitable force translating or rectifying device and an electro-magnetic balancing device for obtaining a measure of the flow of a fluid through a conduit; and Fig. 2 is a plan view of a portion of the apparatus shown in Fig. 1.

In the apparatus somewhat diagrammatically illustrated in Fig. 1, A represents a Venturi tube section of a conduit through which the gas or liquid to be measured flows.

A' and A² represent flexible pipe connections leading from the high and low pressure zones, respectively, of the Venturi tube section A to the force translating or rectifying device, which comprises a lever B suitably fulcrumed as by the knife-edge pivot bearing on the stationary fulcrum block D.

B' represents an adjustable balancing weight carried by the lever B.

The lever B supports a U-tube C, the legs C' and C² of which are at opposite sides of the fulcrum point of the lever B. The flexible pipe connections A' and A² open to the otherwise closed upper ends of the legs C' and C² respectively of the U-tube C. The U-tube is partially filled with a sealing liquid, such as mercury, preferably of substantially greater specific gravity than the gas or liquid flowing through the conduit A.

With the apparatus described, when there is no fluid flow through the conduit A, the sealing liquid will be at the same level in each of the legs C' and C²; but when fluid flows through the conduit A, the pressure transmitted through the flexible pipe A' will be greater than the pressure transmitted through the flexible pipe A² and the sealing liquid will be displaced in part from the leg C' through the connecting yoke portion C³ into the leg C². The difference in the fluid pressures then existing above the sealing liquid levels in the legs C' and C², and hence the difference in height of the liquid columns therein, will be proportional to the velocity head of the fluid at the low pressure zone of the Venturi tube section, and hence proportional to the square of the rate of flow through the conduit.

In order that the change in the torque exerted on the lever B as the sealing liquid is displaced from the leg C' into the leg C² by changes in the differential of the pressures transmitted to the upper ends of the legs C' and C² may be in linear proportion to the change in rate of flow in the conduit, I so relatively proportion the legs that the weight of the sealing liquid displaced will be proportional, not to the difference in the pressures admitted to the upper ends of the legs C' and C², but to the square root of this differential. Where as shown the leg C² is of uniform cross section, this result may be obtained as will be understood by those skilled in the art by shaping the leg C' according to the following formula:

$$d = \sqrt{\frac{2\sqrt{h}}{K} - 1} \cdot D$$

wherein $d$ represents the diameter of the leg C' at the variable distance $h$ from the level of the liquid in the leg C' corresponding to no flow through the conduit A, D represents the diameter of the leg C², and K is a constant. With the apparatus thus constructed the torque on the lever B upon the displacement of liquid from the leg C' into the leg C² is proportional to the rate of flow through the conduit A, and a measure of the force required to balance this torque will be a measure of the rate of flow.

Preferably the means for impressing the balancing force on the lever contain provisions for automatically adjusting the balancing force as required to maintain the lever practically stationary as the torque on the lever upon the displacement of the sealing liquid in the U-tube varies. The novel and convenient means which I employ for impressing the balancing force on the lever B and automatically adjusting this force to maintain the lever practically stationary, and for measuring the balancing force comprises an electromagnetic balancing device exerting a force proportional to its energizing current, means automatically responsive to a slight movement of the lever in either direction from a neutral position for adjusting the intensity of the energizing current, and an ammeter for indicating, recording or integrating the energizing current.

One example of a means of this kind is shown in Fig. 1, wherein there is suspended from the end of the lever B tending to go up when the sealing liquid is displaced from the leg C' into the leg C² a floating coil E, which surrounds a stationary permanent magnet F. The coil E is connected in series with a source of current G, an ammeter H and a rheostat I. J represents a variable resistance connected in shunt across the ammeter terminals whereby the constant of the ammeter may be adjusted. The rheostat I comprises a movable contact member I' movable along and contacting with one or another of a series of contact studs I² which are connected at suitable intervals to a resistance conductor I³. To automatically adjust the rheostat I as required, I employ an electric motor K having a threaded shaft K' passing through a threaded socket formed in the contact device I'. As shown, the motor is provided with terminals K² and K³, which, when connected to a suitable source of current, will cause the motor to turn in a direction to move the contact device I' to the right, as seen in Fig. 1, and thereby reduce the resistance of and increase the current flowing through the circuit including the coil E. The motor also includes another winding of which K² and K⁴ are the terminals. When the terminals K² and K⁴ are connected to a suitable source of current the motor will turn in the direction to move the contact I' to the left, as seen in Fig. 1, and thereby increase the resistance in and reduce the current flowing in the circuit including the coil E. To automatically energize one or the other of the circuits of the motor K as required, I provide stationary contacts L and LA located above and below the lever B, respectively, and engaged by the latter on a slight movement in one direction or the other from its neutral position.

The various circuit connections are as follows: One terminal of the source of current G is connected by the conductor 1 to the lever D, which for this purpose is made of conducting material. As shown, the conductor 1 is directly connected to the fulcrum block D. One terminal of the coil E is also connected to the lever B as by the conductor 2. The other terminal of the coil E is connected by the conductor 3 to one terminal of the ammeter H. The second terminal of the ammeter H is connected by the conductor 4 to the movable contact member I' of the rheostat I. One end of the resistance conductor I³ of the rheostat I is connected to the second terminal of the source of current G. The last mentioned terminal of the source of current is also connected by the conductor 5 to the common terminal K² of the motor K. The terminals K³ and K⁴ of the motor K are connected by conductors 6 and 7 to the contacts L and LA respectively.

The apparatus shown in Figs. 1 and 2 is obviously simple and effective, comparatively inexpensive to construct, and easy to maintain in operative construction.

An important advantage of the use of the electro-magnetic means for obtaining a balancing force is that this permits of the measure of the balancing force by a commercial form of ammeter, which is a highly developed, sensitive, efficient and relatively inexpensive instrument.

While in accordance with the provisions of the statutes I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. A measuring instrument comprising a movable member and balancing means therefor including an electromagnetic device adapted to exert a balancing force on said member varying in linear proportion to the intensity of the electric current energizing said device, and means for supplying said device with an energizing current of regulated intensity, said movable member being provided with a liquid channel so shaped and disposed that liquid partially filling the channel and forming a liquid seal between the opposite ends of the channel will be displaced therein and the force which said device must exert on said member to hold the latter in a predetermined position will be varied on a change in the differential of the fluid pressures in the opposite ends of said channel.

2. A measuring instrument comprising a movable member and balancing means therefor including an electromagnetic device adapted to exert a balancing force on said member tending to maintain the latter in a predetermined position and varying in linear proportion to the intensity of the electric current energizing said device, and means for supplying the latter with an energizing current of regulated intensity, said movable member being provided with a liquid channel of non-uniform cross section so shaped and disposed that liquid partially filling the channel and forming a liquid seal between the opposite ends of the channel will be displaced therein on a variation in the fluid pressures existing in the opposite ends of said channel, and the force which said device must exert on said member to hold the latter in a predetermined position will be varied in non-linear proportion to the changes in the differential of said pressures.

3. A measuring instrument comprising a movable member and balancing means therefor including an electromagnetic device adapted to exert a balancing force on said member tending to maintain the latter in a predetermined position and varying in linear proportion to the intensity of the electric current by which said device is energized, said movable member being provided with a liquid channel of non-uniform cross section so shaped and disposed that liquid partially filling the channel will be displaced therein on a variation in the fluid pressures existing in the opposite ends of said channel and the force which said device must exert on said member to prevent the latter from movement out of its predetermined position, will be varied in non-linear proportion to the changes in said pressure differential, and means responsive to slight movements of said member out of a neutral position for supplying said device with an electric energizing current of the proper intensity to maintain said member in said neutral position.

4. Apparatus for measuring the flow of a liquid through a conduit comprising in combination, a movable member, means for subjecting said member to a force tending to move said member and varying in linear proportion with the fluid rate of flow through said conduit, an electromagnetic device for exerting a balancing force on said member varying in linear proportion with the intensity of the electric current by which said device is energized, means for supplying said device with an electric energizing current of regulated intensity, and means for measuring said energizing current.

5. Fluid measuring apparatus comprising in combination, a conduit through which the fluid to be measured flows, a pivoted member provided with a liquid channel, a body of liquid partially filling the channel and forming a liquid seal between the opposite ends of said channel, said channel being so shaped and disposed that on a change in the differential of the pressures maintained in the opposite ends of said channel, the balancing force necessary to be exerted on said member to hold the latter in a predetermined position will be varied in linear proportion to the square root of said pressure differential, means for subjecting the opposite ends of said channel to pressures such that the differential thereof is proportional to the velocity head of the fluid flowing through said conduit, an electromagnetic device for exerting a balancing force on said member varying in linear proportion with the intensity of the electric current by which the device is energized, means responsive to slight movements of said member out of a neutral position for supplying said device with an electric energizing current of the proper intensity to maintain said member in said neutral position, and means for measuring said energizing current.

GEORGE H. GIBSON.

Witnesses:
PAUL A. BAUCEL,
STANLEY D. BROWN.